United States Patent [19]

Baboudjian et al.

[11] Patent Number: 5,108,721
[45] Date of Patent: Apr. 28, 1992

[54] TREATMENT OF HIGH NICKEL SLIMES

[75] Inventors: Viken P. Baboudjian, Pointe-Claire; Bernard H. Morrison, Victoria; Jack S. Stafiej, Ville St-Laurent, all of Canada

[73] Assignee: Noranda Inc., Toronto, Canada

[21] Appl. No.: 660,748

[22] Filed: Feb. 26, 1991

[30] Foreign Application Priority Data

Apr. 17, 1990 [CA] Canada ................... 2014733

[51] Int. Cl.⁵ .................. B01F 1/00; C01G 53/10
[52] U.S. Cl. .................... 423/150; 75/714; 204/DIG. 13; 423/658.5
[58] Field of Search .......... 204/109, DIG. 13; 423/658.5, 150; 75/714

[56] References Cited

U.S. PATENT DOCUMENTS

| 2,322,786 | 6/1943 | Betterton et al. | 204/109 |
| 4,002,544 | 1/1977 | Heimala et al. | 204/109 |
| 4,229,270 | 10/1980 | Subramanian . | |
| 4,293,332 | 10/1981 | Wang et al. | 75/714 |
| 4,666,514 | 5/1987 | Bertha | 423/150 |

FOREIGN PATENT DOCUMENTS 1091035 12/1980 Canada .

Primary Examiner—John Niebling
Assistant Examiner—Brian M. Bolam
Attorney, Agent, or Firm—Fleit, Jacobson, Cohn, Price, Holman & Stern

[57] ABSTRACT

A two-stage process for treating anode slimes and other residues containing a substantial amount of nickel without significant dissolution of silver and/or selenium in a single autoclave is disclosed. The process comprises, in a first stage, leaching the anode slimes at 15–30% solids in dilute sulphuric acid at a pressure between 4.0 and 5.5 bars and a temperature between 155° C. to 170° C. in the absence of oxygen to solubilize nickel, and in a second stage, without performing a solid liquid separation, leaching the remaining solids at a pressure between 2 and 3.5, preferably about 2.8 bars and a temperature between 110° and 140° C., preferably about 120° C. with oxygen sparging such that the final sulphuric acid concentration is not less than 50 gpl to solubilize copper and tellurium.

6 Claims, 4 Drawing Sheets

TREATMENT OF HIGH NICKEL SLIMES

This invention relates to the treatment of anode slimes from the electrolytic refining of copper, and more particularly to the treatment of high nickel anode slimes.

The electrolytic refining of copper is a process in which a relatively impure copper is electrolytically refined into a pure cathode. As the anode is consumed during electrolysis, copper goes into solution and deposits at the cathode whereas selenium, tellurium and other elements that do not dissolve in the electrolyte sink to the bottom of the electrolytic tank as slimes. Nickel in the anodes when less than 0.3–0.35% dissolves into the electrolyte. However, when the nickel is above this level, it reports to the slimes as a refractory NiO. While copper anode slimes vary widely in composition, they generally contain significant amounts of copper, nickel, selenium, tellurium, lead, silver, gold and some platinum group metals along with nuisance elements such as arsenic, bismuth and antimony.

The slimes are normally treated for their valuable components. One method for treating anode slimes is disclosed in Canadian Patent No. 1,091,035 which was issued on Dec. 9, 1980. This method comprises the steps of leaching the slimes in an autoclave with dilute sulphuric acid under an oxygen partial pressure of between 2 and 3.5 bars and at an elevated temperature between 110° and 140° C. until copper and tellurium in the slimes are substantially dissolved, and effecting a liquid-solid separation of the leached slurry so as to separate the leach liquor from the leach slimes. The pressure leach liquor (PLL) is treated with metallic copper to cement the tellurium as copper telluride and such copper telluride is separated from the remaining solution for production of tellurium. The remaining solution is suitable for the production of copper sulphate. The pressure leached slimes (PLS) containing mainly selenium, lead, silver, gold and remaining impurities are dried, mixed with a binder and pelletized. The pellets are then roasted to remove selenium as selenium dioxide and the roasted pellets are smelted in a Dore furnace to remove the remaining impurities leaving a so-called Dore metal containing essentially silver and gold. At Noranda Minerals Inc., the leached slimes are dried and fed directly into a TBRC furnace for smelting and refining to recover the selenium and produce a Dore metal.

Leaching of slimes high in Ni under the above autoclave operating conditions does not extract a substantial amount of the nickel since it is present as a refractory NiO insoluble under these conditions. Nickel in leached slimes in excess of 3% has been found to create smelting difficulties due to the production of viscous slag which curtail the efficient operation of a Dore or TBRC furnace.

The necessity of producing a slime, from electrolytic copper refining, low enough in Ni for direct processing in the Dore furnace for precious metal production and refining was recognised as far back as 1937. In an article entitled "An Investigation into Anode Furnace Refining of High Nickel Blister", Trans. Amer. Inst. Mining and Metal. Eng., 1944, 159, pp. 65–69, F. Bernard, of the International Nickel Company, reported at the AIME meeting held in New-York in 1938 of a method of improving the solubility of the nickel constituents in the anodes, during electrorefining, thus decreasing the percentage of nickel in the anodes diverted to the slimes. The nickel dissolving electrochemically and entering the electrolyte presented no difficulty from a treatment standpoint whereas, nickel entering the slimes necessitated extensive treatment consisting of repeated roasting and leaching operations before the nickel content was low enough to permit the slimes to proceed to the Dore furnace. The process consisted of controlling the oxygen and thus reducing the amount of insoluble NiO reporting to the slimes. Although the process has its advantages and is applicable to control Ni in slimes to a certain level, high nickel anodes will produce high nickel slimes even at low oxygen levels.

Furthermore, the amount of soluble copper in anodes during electrolysis was reduced to such a level where no liberator capacity was required. In a custom refinery where the elimination of As, Sb, Bi, and Ni, is required after decopperizing the electrolyte the elimination of the soluble copper in anodes presents a problem as a net source of copper input to the electrolyte would be required.

The direct smelting to Dore metal of high Ni anodes slimes was recently reported by G. Berg of Boliden in an article entitled "Dore Smelting of High Nickel Slimes Using Sodium Phosphate Slag", Proceedings of IPMI, 1986, pp. 589–596. Berg developed a sodium phosphate slag to smelt high nickel anodes slimes, as the traditional smelting process of anode slimes using sodium borate slag was not very well suited for treating high nickel slimes. Smelting of such slimes resulted in increased consumption of chemicals, reduced precious metal yields, reduced smelting capacity and increased wear of the furnace lining. Or else it was necessary to limit the intake of nickel bearing secondary raw materials at the copper plant.

At Boliden, slimes with more than 3% Ni in the slimes hampered the efficient smelting of the slimes. When the nickel content in the decopperised slimes were over 3% the slag could not dissolve all the nickel oxide. Pure nickel oxide (NiO melting point 1990° C.) has a higher density than the slag and lower than Dore metal. A viscous semi-solid phase with high nickel content is formed between the Dore metal and the slag. This semi-solid phase prevents the sedimentation of Dore metal and thereby furnace yields deteriorate. Boliden was forced to limit the nickel content of anodes to 0.32%. By the introduction of the phosphate slag the nickel in the anodes was increased to about 0.4%.

The Outokumpu slimes treatment process is reported by O. Hyvarinen et al. in an article entitled "Selenium and Precious Metals Recovery from Copper Anode Slimes at Outokumpu Pori Refinery", in Precious Metals, pp. 537–548, Proceedings of International Symposium of Precious Metals AIME Annual Meeting, Los Angelos, Calif. Feb. 27–29, 1984. It consists of an atmospheric de-copperizing leach where slimes are fed to a vessel at solid loading of about 10%. Copper is dissolved by air oxidation at 80° C. at acid concentrations of 100–150 gpl. The reaction is carried out for about 2–3 hours. Some copper is left in the solids to prevent Te dissolution. The leachate is returned after filtration to the tankhouse (<1 mg/l of Te) and the solids to the nickel removal vessel after solid/liquid separation.

Slurry from the copper leaching is pumped to a pressure leaching reactor. Fresh acid (93%) is added to the autoclave. Black acid from Ni sludge production (70% acid) could also be used. The reactor is closed and the temperature raised by injecting steam. The temperature needed for the leaching of nickel oxide is 160°–200° C.

and the pressure 7-8 bars. The remaining copper, most of the tellurium (75-90%), silver and selenium dissolve at the same time. The reactions are exothermic. After leaching the Te, Ag and Se are precipitated by $SO_2$ followed by Te cementation on copper. The leachate is then sent for Ni sludge production and then returned to the tankhouse.

The above process requires two separate vessels one for de-copperizing the slimes and one for de-nickeling the slimes. The vessel used for de-nickeling is a high-pressure vessel and either superheated steam or electric heating is used. Furthermore, the process dissolves Ag and Se which need to be precipitated with $SO_2$ and since Te is also dissolved a Se-Te cross contamination is likely to occur. The above renders the whole process complex.

It is therefore the object of the present invention to provide a process for treating high nickel anode slimes which allow efficient and economical removal of nickel together with copper and a major portion of tellurium from the anode slimes in a single vessel and without the dissolution of Se and Ag.

The process in accordance with the present invention comprises:

a) in a first stage, leaching the anode slimes at 15-30% solids in dilute sulphuric acid (150-350 gpl) at a pressure between 4.0 and 5.5 bars and a temperature between 155° C. and 170° C. in the absence of oxygen to solubilize nickel; and b) in a second stage, without performing a solid/liquid separation, leaching the remaining solids at a pressure between 2 and 3.5, preferably about 2.8 bars and at a temperature between 110° and 140° C. with oxygen sparging such that the final sulphuric acid concentration is not less than 50 gpl to solubilize copper and tellurium.

At least 50% of the tellurium and at least 70% of the arsenic content of the anode slimes are solubilized at the end of the second stage.

Any antimony and bismuth dissolved in the first stage is precipitated at the end of the second stage.

The leach time for each stage of the process is between 3 and 4 hrs.

The invention will now be disclosed in more detail with reference to experimental test results shown in Tables and illustrated in the accompanying drawings in which.

An experimental test program was conducted to determine the deportment of Ni to the slimes from high Ni bearing anodes, and to develop a process for selectively leaching the Ni without the dissolution of Se and Ag in the slimes. For that purpose, copper anode charges analyzing 3550-5620 ppm Ni were produced at the Horne Division of Noranda Minerals Inc. The anodes from a given charge were loaded to one section at the CCR Refinery of Noranda Minerals Inc. and electrorefined. The slimes produced were sampled and analysed and the results show that the fraction of Ni in the anodes reporting to the slimes increases with the nickel and oxygen content of the anodes as shown in Table I and illustrated in FIGS. 1 and 2.

TABLE I

DISTRIBUTION OF NICKEL TO SLIMES FROM HIGH NICKEL ANODES

| CHARGE No. | ANODE COMPOSITION | | Ni DISTRIBUTION TO SLIMES, % | Ni ASSAY OF SLIME, % |
|---|---|---|---|---|
| | Ni (%) | $O_2$ (ppm) | | |
| 110 | 0.355 | 2020 | 5.6 | 2.13 |
| 111 | 0.417 | 2690 | 14.1 | 6.83 |
| 158 | 0.448 | 1390 | 7.8 | 4.39 |
| 136 | 0.439 | 1820 | 9.6 | 6.96 |
| 171 | 0.439 | 2470 | 16.0 | 8.39 |
| 22 | 0.466 | 1520 | 12.0 | 4.90 |
| 76 | 0.562 | 1020 | 19.1 | 9.86 |

Figure 1:
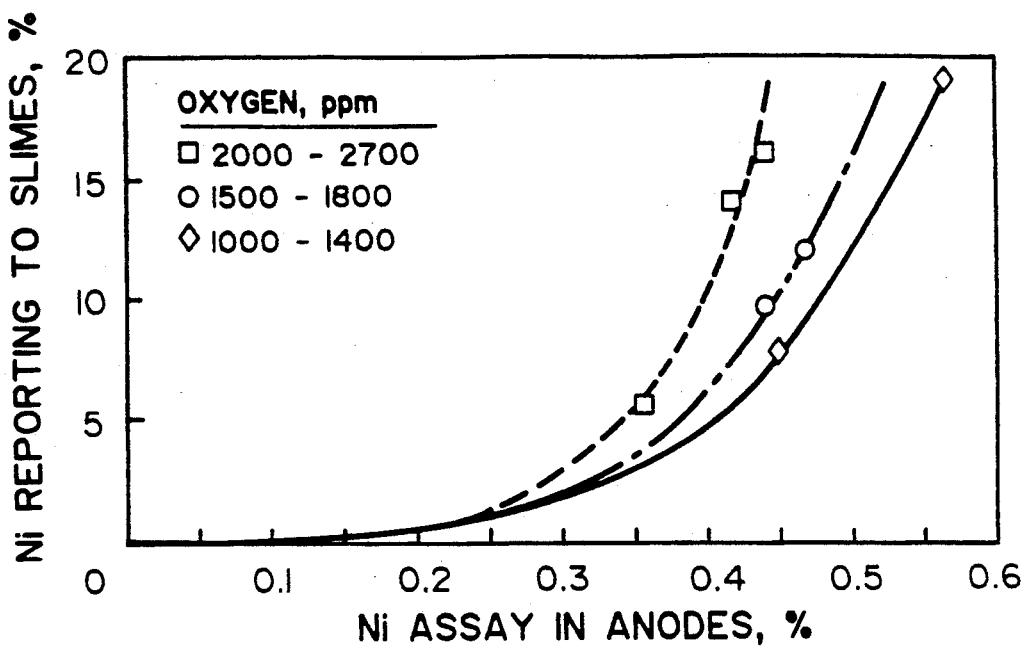
FIG. 1 illustrates the % Ni in anodes versus % Ni reporting to slimes at varying oxygen levels.

The level of Ni in the slimes, for a given slime fall, therefore also increases with these two parameters:

At anodes Ni levels of 4480 ppm and 5620 ppm (and constant oxygen of about 1200 ppm), 7.8% and 19.1% of the Ni in the anodes reported to the slimes respectively (FIG. 1).

At anode Ni levels of about 4400 ppm, 7.8%, 9.6%, and 16% of the Ni in the anodes reported to the slimes for anode oxygen levels of 1390, 1820 and 2470 ppm respectively (FIG. 1).

Figure 2:
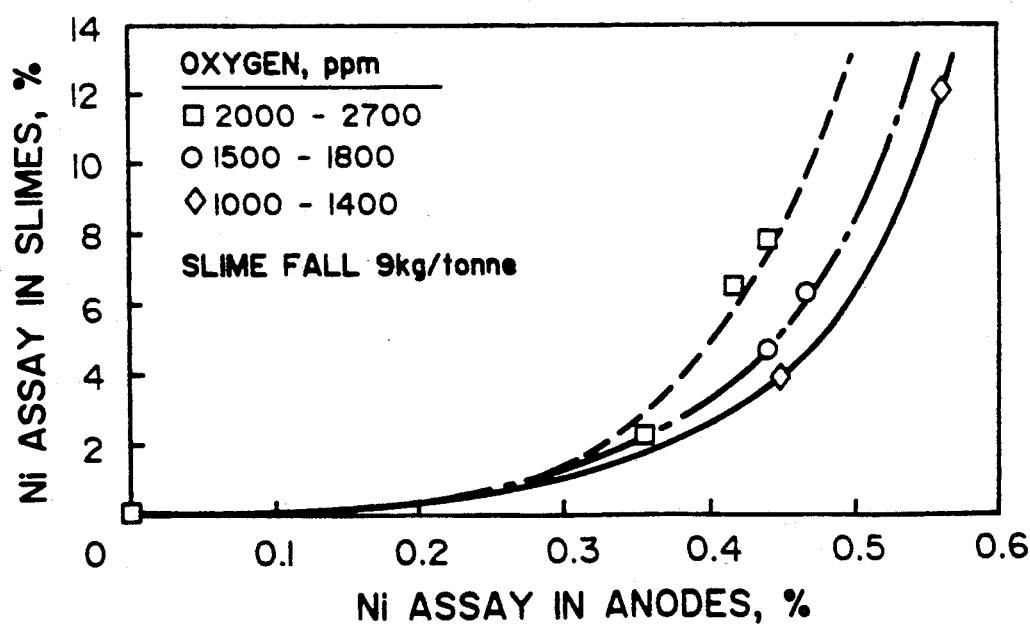
FIG. 2 illustrates the % Ni in anodes versus Ni in slimes at varying oxygen levels.

At anode Ni levels of about 3500, 4500 and 5500 ppm and (a constant oxygen level of 1500 ppm) the slimes will assay 2, 6 and 12% Ni respectively (at a constant slime fall of 9 kg/tonne, FIG. 2).

Figure 3:
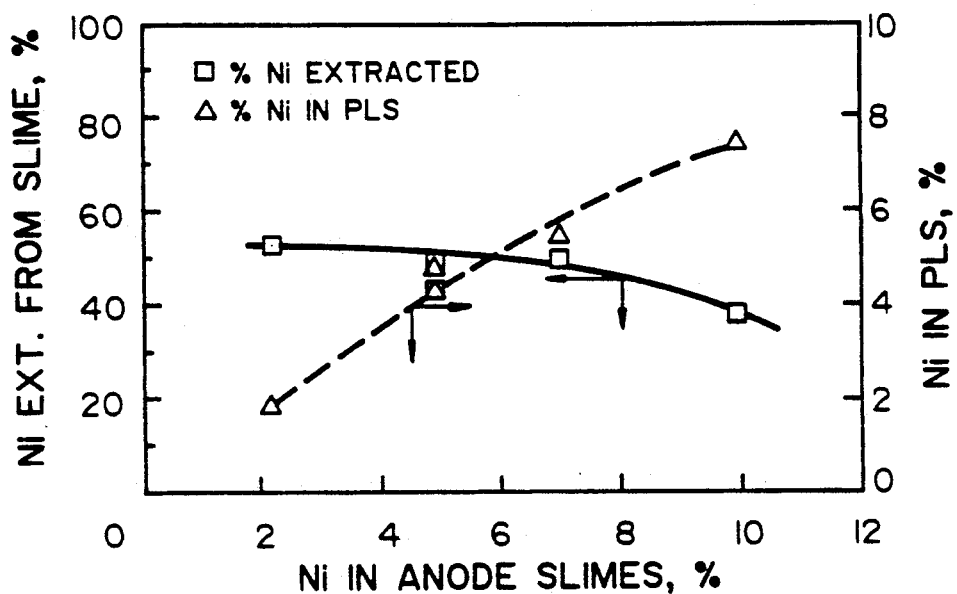
FIG. 3 illustrates Ni extraction in the autoclave under the operating conditions disclosed in Canadian Patent No. 1,091,035.

Leaching of the above high nickel slimes in an autoclave under the conditions disclosed in Canadian Patent No. 1,091,035, extracted about 38-53% of the Ni. Slimes with 2.2, 7.0, and 9.9% Ni generated PLS assaying 1.9, 5.4, and 7.4% Ni as shown in the following Table II and FIG. 3.

TABLE II

SUMMARY - RESULTS OF HIGH NICKEL SLIMES LEACHING TESTS UNDER AUTOCLAVE LEACHING CONDITIONS OF CANADIAN PATENT NO. 1,091,035

| CHARGE | TEST | Nickel in SLIMES |
|---|---|---|

TABLE II-continued

SUMMARY - RESULTS OF HIGH NICKEL SLIMES LEACHING TESTS
UNDER AUTOCLAVE LEACHING CONDITIONS OF CANADIAN PATENT
NO. 1,091,035

| No | No | % | | Cu | Ni | As | Sb | Bi | Te | Se* | Ag* |
|---|---|---|---|---|---|---|---|---|---|---|---|
| 110 | 12 | 2.16 | Extracted, % | 99.7 | 52.8 | 82 | 4.4 | 5.8 | 79 | — | — |
|  |  |  | PLS assay, % | 0.1 | 1.87 | — | — | — | — | — | — |
|  |  |  | PLL, g/l, *mg/l | 53.4 | 3.32 | — | — | — | — | 73 | 0.5 |
| 22 | 1 | 4.90 | Extracted, % | 99.3 | 43.0 | 70 | 2.4 | 12 | 68 | — | — |
|  |  |  | PLS assay, % | 0.2 | 4.8 | — | — | — | — | — | — |
|  |  |  | PLL, g/l, *mg/l | 51.8 | 6.7 | — | — | — | — | 40 | 0.4 |
| 22 | 2 | 4.90 | Extracted, % | 99.3 | 49.0 | 78 | 2.5 | 10 | 70 | — | — |
|  |  |  | PLS assay, % | 0.2 | 4.3 | — | — | — | — | — | — |
|  |  |  | PLL, g/l, *mg/l | 49.8 | 7.7 | — | — | — | — | 70 | 1.9 |
| 136 | 11 | 6.96 | Extracted, % | 99.5 | 49.6 | 68 | 6.1 | 1.4 | 63 | — | — |
|  |  |  | PLS assay, % | 0.1 | 5.4 | — | — | — | — | — | — |
|  |  |  | PLL, g/l, *mg/l | 40.5 | 8.3 | — | — | — | — | 48 | 0.4 |
| 76 | 5 | 9.89 | Extracted, % | 99.5 | 38.2 | 76 | 3.7 | 4.4 | 57 | — | — |
|  |  |  | PLS assay, % | 0.2 | 7.4 | — | — | — | — | — | — |
|  |  |  | PLL, g/l, *mg/l | 53.3 | 7.5 | — | — | — | — | 77 | — |

AUTOCLAVE LEACHING CONDITIONS:

| SOLIDS LOADING | 20% |
|---|---|
| LEACHING TIME | 3 hrs |
| INITIAL ACID | 250 gpl |
| LEACHING PRESSURE | 2.8 bars |
| LEACHING TEMPERATURE | 120° C. |

Nickel in leached slimes in excess of 3% create slagging difficulties during smelting as mentioned previously.

High pressure leaching at 4.5-11 bars, with oxygen sparging was tried for simultaneous de-nickeling and de-copperising. It solubilized effectively Cu, Ni, Te but also Se as shown in the following Table III and disclosed in U.S. Pat. No. 4,229,270 of INCO, resulting in a significant loss of selenium. The leachate analysed 2.1-7.5 gpl Se as compared to <0.1 gpl for the mode of operation disclosed in Canadian Patent No. 1,091,035.

TABLE III

SUMMARY-RESULTS OF HIGH NICKEL SLIMES LEACHING TESTS FOR
SIMULTANEOUS DE-NICKELING AND DE-COPPERISING AUTOCLAVE
LEACHING CONDITIONS

| CHARGE No | TEST No | Ni IN SLIMES % | PRESSURE bar | LEACH TIME hr. | | Cu | Ni | Se* | Ag* |
|---|---|---|---|---|---|---|---|---|---|
| 76 | 43 | 9.86 | 4.5 | 4 | Extracted, % | 99.7 | 92.8 | 8 | — |
|  |  |  |  |  | PLS assay, % | 0.1 | 1.1 | — | — |
|  |  |  |  |  | PLL, g/l, *mg/l | 39.3 | 20.0 | 2092 | 0.5 |
| 111 | 10 | 6.88 | 6.2 | 3 | Extracted, % | 99.7 | 98.3 | 26 | — |
|  |  |  |  |  | PLS assay, % | 0.1 | 0.2 | — | — |
|  |  |  |  |  | PLL, g/l, *mg/l | 47.5 | 17.9 | 7507 | 0.3 |

SIMULTANEOUS DE-NI AND DE-CU AUTOCLAVE LEACHING CONDITIONS:

| SOLIDS LOADING | 20% |
|---|---|
| OXYGEN SPARGING | |

Leaching at pressures in the range of 4.5-11 bars for three hours with no oxygen sparging as per U.S. Pat. No. 4,229,270 of INCO was also tried. It extracted 98% of the Ni but only about 34% Cu and 1% Te with virtually no Ag or Se dissolution. However, Sb and Bi extractions were an order of magnitude larger than with the process disclosed in Canadian Patent No. 1,091,035 as shown in Table IV.

TABLE IV

SUMMARY - RESULTS OF HIGH NICKEL SLIMES LEACHING TESTS
FOR DE-NICKELING AUTOCLAVE LEACHING CONDITIONS

| CHARGE No | TEST No | PRES bar | Ni In SLIMES % | | Cu | Ni | As | Sb | Bi | Te | Se* | Ag* |
|---|---|---|---|---|---|---|---|---|---|---|---|---|
| 76 | 6 | 4.5 | 9.89 | Extracted, % | 26.7 | 97.9 | 83 | 50 | 33 | 1 | — | — |
|  |  |  |  | PLS assay, % | 15.0 | 0.3 | — | — | — | — | — | — |
|  |  |  |  | PLL, g/l, *mg/l | 10.3 | 28.4 | — | — | — | — | 37 | 3.7 |
| 111 | 23 | 4.8 | 6.88 | Extracted, % | 57.6 | 97.9 | — | — | — | — | — | — |
|  |  |  |  | PLS assay, % | 10.6 | 0.2 | — | — | — | — | — | — |
|  |  |  |  | PLL, g/l, *mg/l | 23.9 | 15.4 | — | — | — | — | 46 | — |
| 22 | 3 | 11.0 | 6 | Extracted, % | 37.7 | 99.6 | 92 | 45 | 33 | <1 | — | — |
|  |  |  |  | PLS assay, % | 13.9 | 0.03 | — | — | — | — | — | — |
|  |  |  |  | PLL, g/l, *mg/l | 14.7 | 16 | — | — | — | — | 21 | 0.42 |
| 76 | 4 | 11.0 | 9.89 | Extracted, % | 25.7 | 99.7 | 91 | 25 | 25 | 1 | — | — |
|  |  |  |  | PLS assay, % | 15.6 | <0.1 | — | — | — | — | — | — |

TABLE IV-continued
SUMMARY - RESULTS OF HIGH NICKEL SLIMES LEACHING TESTS FOR DE-NICKELING AUTOCLAVE LEACHING CONDITIONS

| | | | | | | | | |
|---|---|---|---|---|---|---|---|---|
| PLL, g/l, *mg/l | 10.1 | 29.3 | — | — | — | — | 46 | 1.4 |

DE-NICKELING CONDITIONS:

| | |
|---|---|
| SOLIDS LOADING | 20% (296 g slimes per liter of solution) |
| LEACHING TIME | 3 hrs |
| INITIAL ACID | 250 gpl |
| NO OXYGEN SPARGING | |

On the average 42% and 30% of the Sb and Bi were extracted as compared to 3.7% and 7.6% for the present process, respectively. This will result in recycling the impurities to the tankhouse instead of being reverted to the smelter.

In accordance with the present invention, a process was developed at the 4L stage to overcome the above drawbacks. The process consisted of a three hours leach at 4.5 bar and 160° C. for nickel removal, with no oxygen sparging at 20% solids and an initial acid concentration of 250 gpl. This was followed by another three hours leach at 120° C. with oxygen sparging and a total pressure leach of 2.8 bar. The second leach, to extract Cu and Te and precipitate Sb and Bi leached in the first stage, is carried in the same vessel. Thus the double handling of solids is eliminated.

The results of the two-stage leaching tests are given in the following Table V.

0.3% Ni and 0.2% Cu was produced as shown in the following Table VI.

TABLE VI
SUMMARY-HIGH NICKEL SLIMES LEACHING PLANT TEST IN AUTOCLAVE No 3

| ELEMENT | SLIMES ASSAY % | LEACH LIQUOR gpl | LEACHED SLIMES % | EXTRACTION % |
|---|---|---|---|---|
| Cu | 19.20 | 62.90 | 0.19 | 99.5 |
| Ni | 9.20 | 25.10 | 0.31 | 98.3 |
| Te | 1.23 | 2.29 | 0.81 | 66.3 |
| As | 1.17 | 3.02 | 0.30 | 87.7 |
| Sb | 1.12 | 0.04 | 1.81 | 1.4 |
| Bi | 0.26 | 0.01 | 0.36 | 6.5 |
| Se | 10.70 | 0.18 | 16.30 | 0.7 |
| Ag | 22.00 | 0.0006 | 32.32 | <0.001 |

LEACHING CONDITIONS:

2450 kg of slimes
6950 L of Liquor

TABLE V
SUMMARY - RESULTS OF HIGH NICKEL SLIMES LEACHING TESTS UNDER PROPOSED AUTOCLAVE LEACHING CONDITIONS

| CHARGE No | TEST No | Nickel in SLIMES % | | Cu | Ni | As | Sb | Bi | Te | Se* | Ag* |
|---|---|---|---|---|---|---|---|---|---|---|---|
| 110 | 29 | 2.16 | Extracted, % | 99.6 | 99.7 | 93 | 11 | 11 | 82 | — | — |
| | | | PLS assay, % | 0.15 | 0.01 | — | — | — | — | — | — |
| | | | PLL, g/l, *mg/l | 68.9 | 6.5 | — | — | — | — | 75 | <2.6 |
| 110 | 40 | 2.16 | Extracted, % | 99.5 | 98.7 | 94 | 2.2 | 10 | 85 | — | — |
| | | | PLS assay, % | 0.19 | 0.05 | — | — | — | — | — | — |
| | | | PLL, g/l, *mg/l | 63.9 | 6.0 | — | — | — | — | 92 | <22.9 |
| 22 | 35 | 4.90 | Extracted, % | 99.5 | 99.4 | 85 | 2.9 | 4.8 | 84 | — | — |
| | | | PLS assay, % | 0.2 | 0.1 | — | — | — | — | — | — |
| | | | PLL, g/l, *mg/l | 49.8 | 13.5 | — | — | — | — | 163 | — |
| 111 | 28 | 6.38 | Extracted, % | 99.6 | 99.0 | 89 | 4.9 | 16 | 71 | — | — |
| | | | PLS assay, % | 0.1 | 0.1 | — | — | — | — | — | — |
| | | | PLL, g/l, *mg/l | 46.9 | 17.0 | — | — | — | — | 115 | <2.3 |
| 136 | 38 | 6.96 | Extracted, % | 99.7 | 99.4 | 78 | 6.6 | 2 | 54 | — | — |
| | | | PLS assay, % | 0.1 | 0.1 | — | — | — | — | — | — |
| | | | PLL, g/l, *mg/l | 46.5 | 12.9 | — | — | — | — | 62 | <21 |
| 76 | 31 | 9.86 | Extracted, % | 99.3 | 95.2 | 88 | 5.1 | 2.2 | 78 | — | — |
| | | | PLS assay, % | 0.2 | 0.9 | — | — | — | — | — | — |
| | | | PLL, g/l, *mg/l | 39.5 | 25.7 | — | — | — | — | 153 | 2.6 |
| 76 | 32 | 9.86 | Extracted, % | 99.4 | 95.0 | 91 | 6.3 | 1.6 | 57 | — | — |
| | | | PLS assay, % | 0.1 | 0.7 | — | — | — | — | — | — |
| | | | PLL, g/l, *mg/l | 36.8 | 21.0 | — | — | — | — | 45 | 9 |

PROPOSED AUTOCLAVE LEACHING CONDITIONS:

| | |
|---|---|
| SOLIDS LOADING | 20% |
| INITIAL ACID | 250 gpl |
| LEACHING TIME | 2.5 hrs per STAGE |
| FIRST STAGE, DE-N | 4.5 bar, 160° C. NO OXYGEN SPARGING |
| SECOND STAGE, DE-Cu | 2.8 bar, 120° C. |

The above process produced a PLS with less than 1% Cu and Ni. Te extraction exceeded, on the average, 70% with virtually no Se and Ag dissolution. The Sb and Bi extractions, 5.6% and 6.8%, respectively, were of the same order as for the present practice as disclosed in Canadian Patent No. 1,091,035.

The above process was also tested in a full size autoclave. About 2450 kg of slimes analysing 9.2% Ni and 19.2% Cu, were leached in the autoclave. A PLS with 250 gpl initial acid
3 hrs at 4.5 bar, 160° C., no oxygen
3 hrs at 2.8 bar total pressure, 120° C., oxygen sparging Te extraction was 66% and the As, Sb and Bi leached were 88%, 6.5% and 1.4%, respectively.

Figure 4:
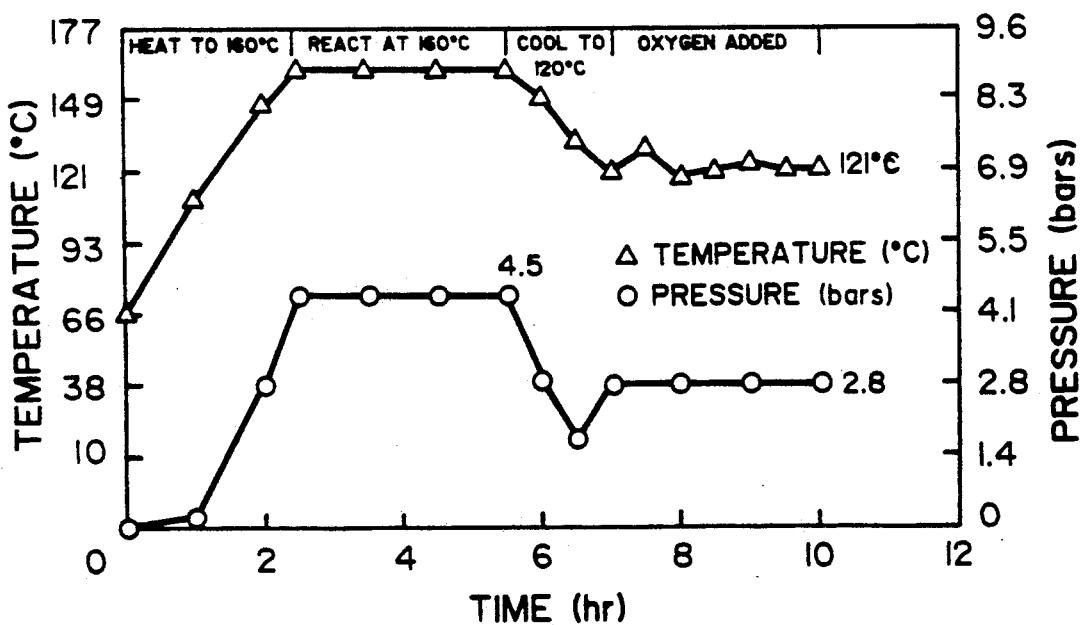
FIG. 4 illustrates the temperature and pressure profiles in the autoclave in the process in accordance with the present invention.
Figure 5:
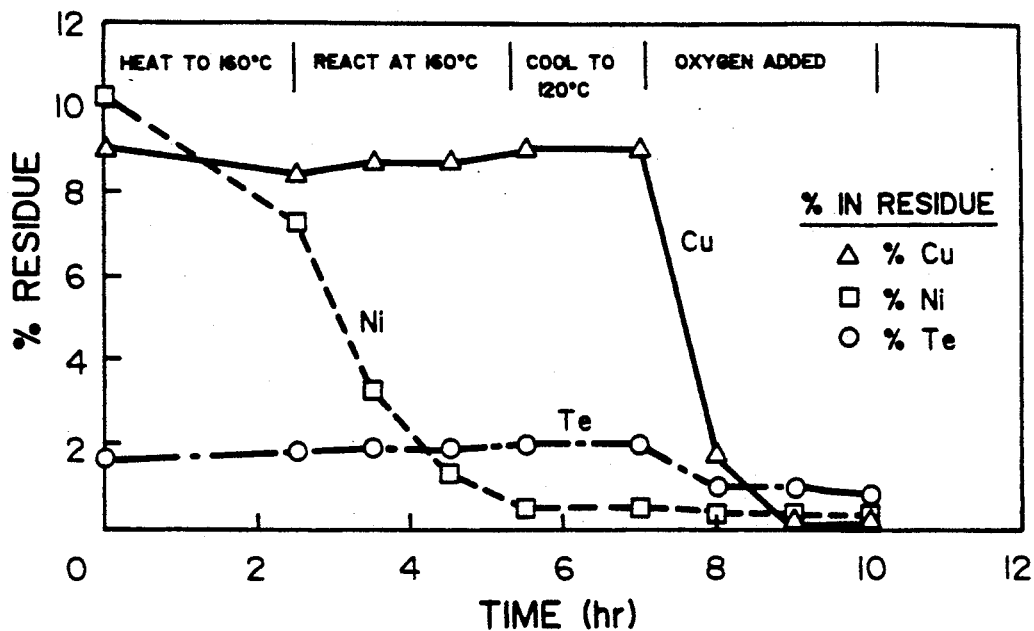
FIGS. 5 and 6 show the extraction kinetics for Cu, Ni and Te.
Figure 6:
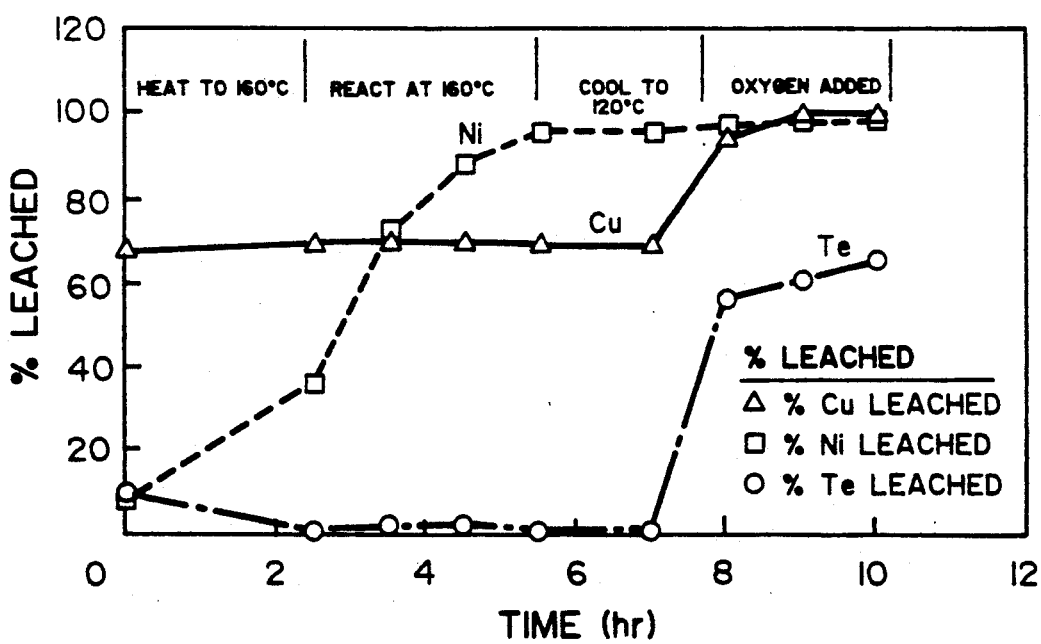
Figure 7:
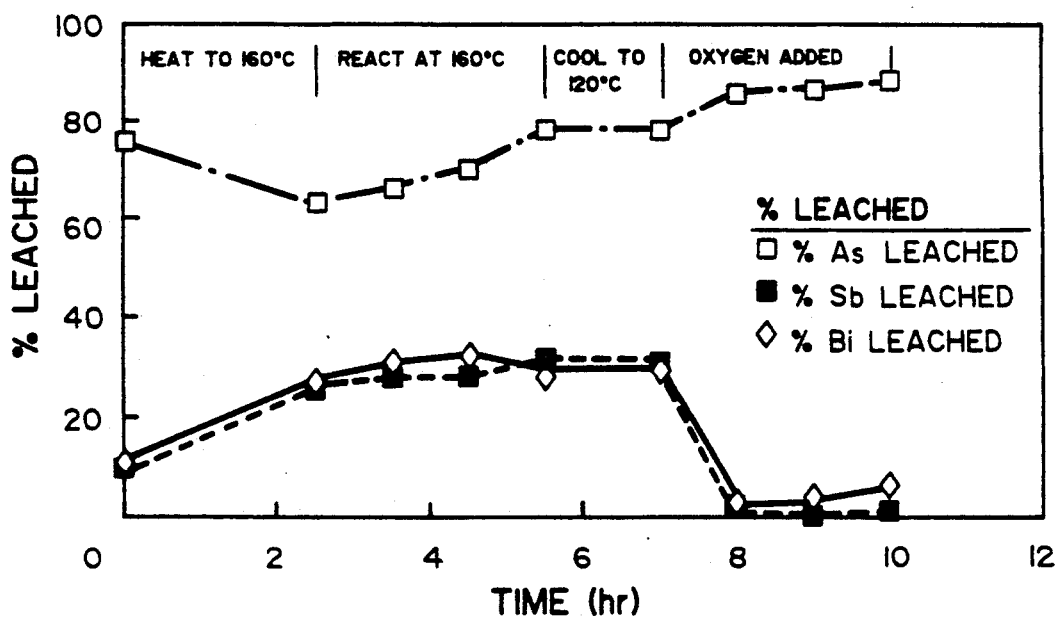
FIG. 7 shows the kinetics of As, Sb and Bi extraction and precipitation.

The temperature and pressure profiles in the autoclave during the trial are given in FIG. 4. The extraction kinetics for Ni, Cu and Te in residue and leached, respectively, are given in FIGS. 5 and 6. The kinetics of As, Sb and Bi extraction and precipitation are given in FIG. 7.

The 10 hrs cycle time may be reduced by decreasing the heating and cooling times by proper engineering design. The reaction time may also be reduced without significantly effecting the Cu, and Te levels in the PLS, but at the expense of somewhat higher Ni levels. These changes should lower the total cycle time to 6-7 hrs.

The test were carried out at 20% solids. Solids loadings may be increased to 30%. All these changes will result in treating in 6-7 hrs the equivalent of 1.5 batch as presently done in the autoclave.

We claim:

1. A two-stage process for treating anode slimes and other residues containing a substantial amount of nickel without significant dissolution of silver and/or selenium in a single autoclave comprising:
   a) in a first stage, leaching the anode slimes at 15-30% solids in dilute sulphuric acid at a pressure between 4.0 and 5.5 bars and a temperature between 155° C. to 170° C. in the absence of oxygen to solubilize nickel; and
   b) in a subsequent second stage, in the same autoclave without performing a solid liquid separation, leaching the remaining solids at a pressure between 2 and 3.5 bars and a temperature between 110° and 140° C. with oxygen sparging such that the final sulphuric acid concentration is not less than 50 gpl to solubilize copper and tellurium.

2. A two-stage process as defined in claim 1, wherein the pressure in the second stage is about 2.8 bars and the temperature about 120° C.

3. A two-stage process as defined in claim 1, wherein at least 50% of the tellurium content of the anode slimes is solubilized at the end of the second stage.

4. A two-stage process as defined in claim 1, wherein at least 70% of the arsenic content of the anode slimes is also solubilized at the end of the second stage.

5. A two-stage process as defined in claim 1, wherein any antimony and bismuth dissolved in the first stage is precipitated at the end of the second stage.

6. A two-stage process as defined in claim 1, wherein each stage of the process last about 3 to 4 hours.

* * * * *